(12) United States Patent
Bower et al.

(10) Patent No.: US 6,231,135 B1
(45) Date of Patent: May 15, 2001

(54) HYBRID BRAKE SYSTEM

(75) Inventors: Glenn R. Bower, Barneveld; Michael D. Koplin, Madison, both of WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/302,766

(22) Filed: Apr. 30, 1999

(51) Int. Cl.[7] ...................................................... B60T 13/74
(52) U.S. Cl. .................................. 303/152; 60/574; 60/592
(58) Field of Search ............................. 303/113.3, 114.3, 303/114.1, 151, 152; 60/574, 592

(56) References Cited

U.S. PATENT DOCUMENTS

| | | | |
|---|---|---|---|
| 4,161,105 | * 7/1979 | Hagiwara | 60/592 |
| 4,229,940 | * 10/1980 | Higgerson et al. | 60/574 |
| 5,433,512 | * 7/1995 | Aoki et al. | 303/20 |
| 5,716,108 | * 2/1998 | Asa et al. | 303/152 |
| 5,941,608 | * 8/1999 | Campau et al. | 303/113.4 |
| 5,967,621 | * 10/1999 | Ito et al. | 303/152 |
| 6,021,365 | * 2/2000 | Ishii et al. | 303/152 |
| 6,079,793 | * 6/2000 | Takayama et al. | 303/15 |

* cited by examiner

Primary Examiner—Douglas C. Butler
Assistant Examiner—Robert A. Siconolfi

(74) Attorney, Agent, or Firm—Baker & Daniels

(57) ABSTRACT

A hybrid brake system for a vehicle propelled at least by a rotating electric motor powered by a storage battery and in communication with at least one ground-engaging wheel. The hybrid brake system includes a vehicle braking control device and an electrical brake system including the electric motor and the battery, the battery providing an electrical load on the motor during times when the vehicle braking control device is actuated. Rotation of the motor during actuation of the vehicle braking control device provides electrical power to the battery, whereby the battery receives an electrical charge. The motor rotation is slowed by the electrical load, whereby the vehicle is braked by the motor. The hybrid brake system also includes a mechanical brake system including a hydraulic cylinder, a piston sealably and slidably disposed therein and partially defining with the cylinder a chamber of variable volume, the pressure of the fluid in the chamber varying with movement of the piston in the cylinder. A mechanical brake arrangement is in fluid communication with the chamber and is operatively coupled to at least one ground-engaging wheel for slowing the rotation thereof. The mechanical brake arrangement is variably actuated in response to changes in the pressure of the fluid during times when the vehicle braking control device is actuated, whereby the vehicle is braked by the mechanical brake system. The hybrid brake system also defers substantial actuation of the mechanical brake arrangement during actuation of the vehicle braking control device until after the electrical brake system has been actuated, by expanding the chamber volume in response to an increase in pressure of the fluid in the chamber.

19 Claims, 12 Drawing Sheets

FIG_1

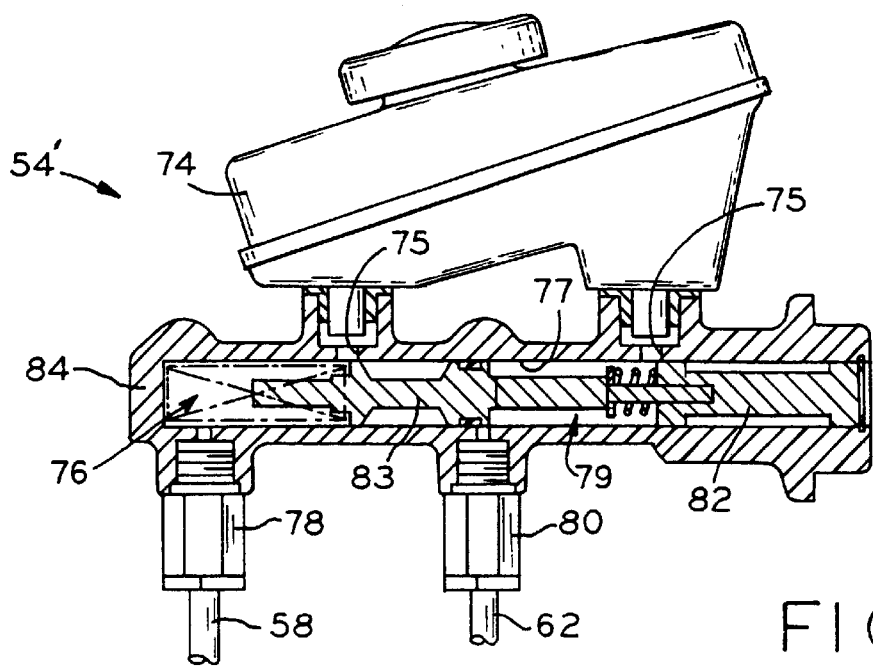
FIG_3
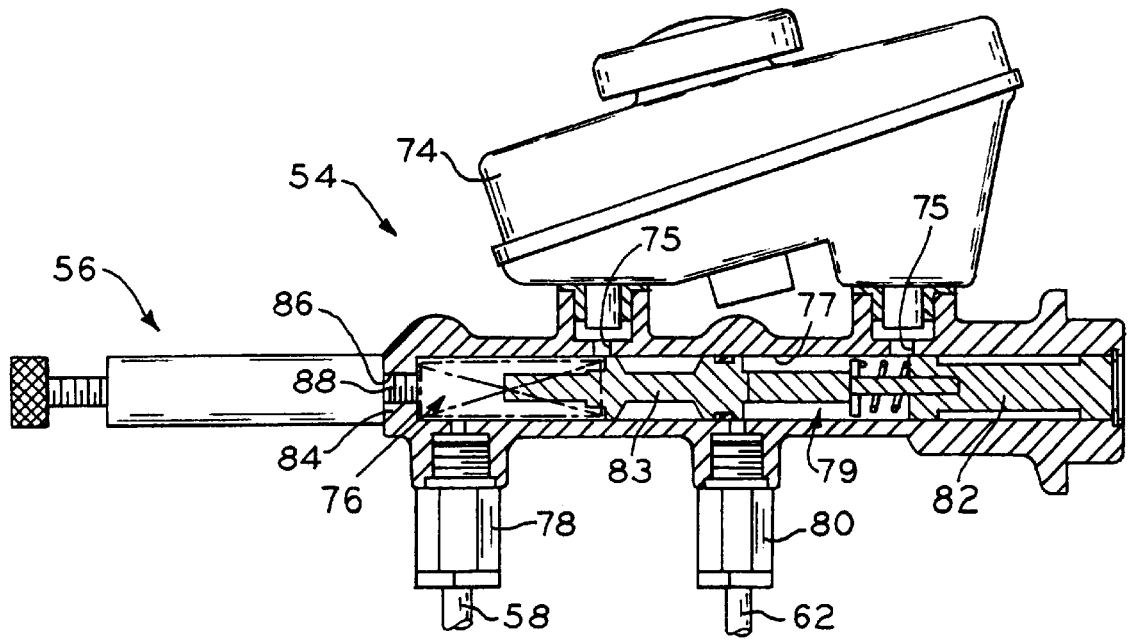
FIG_4

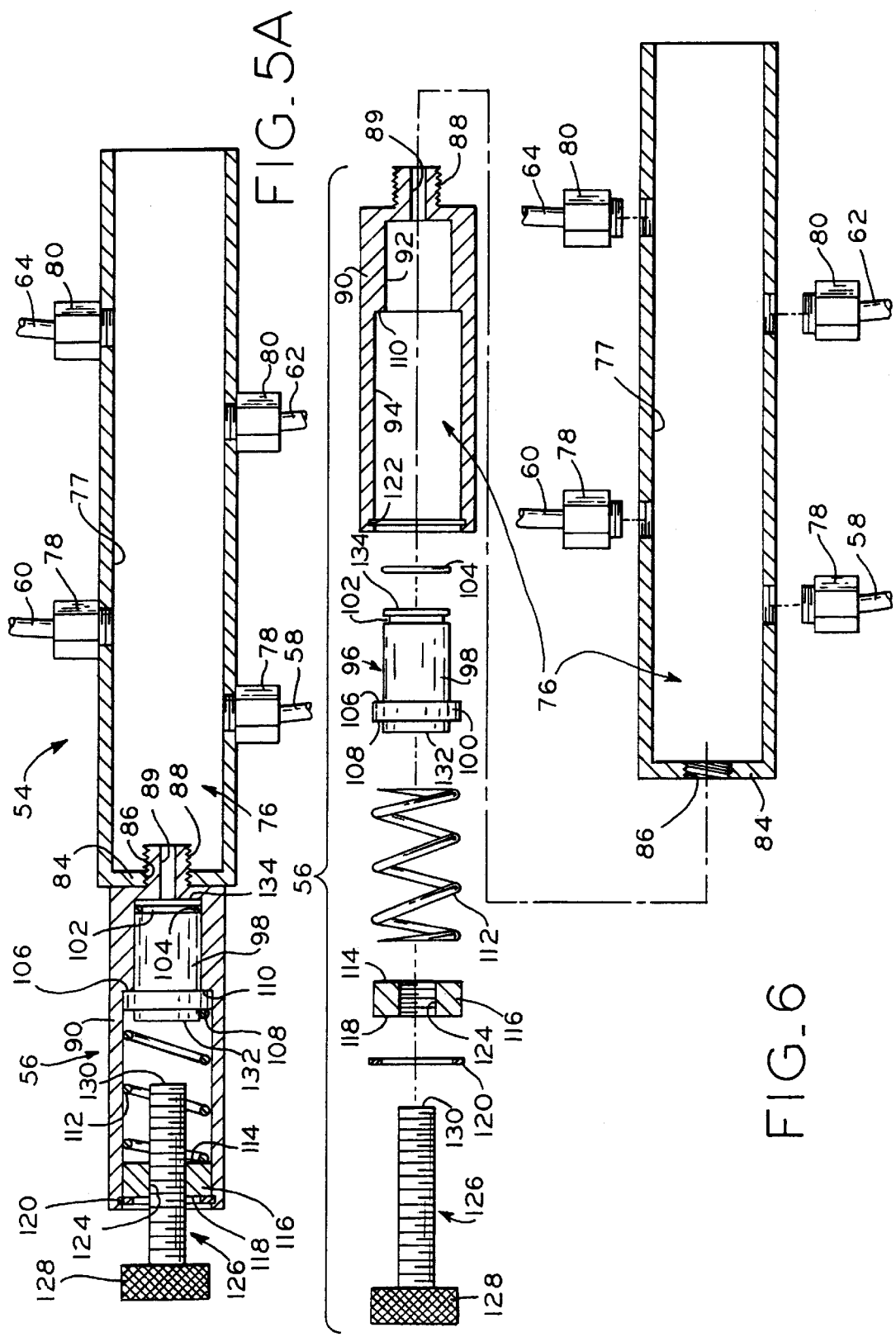

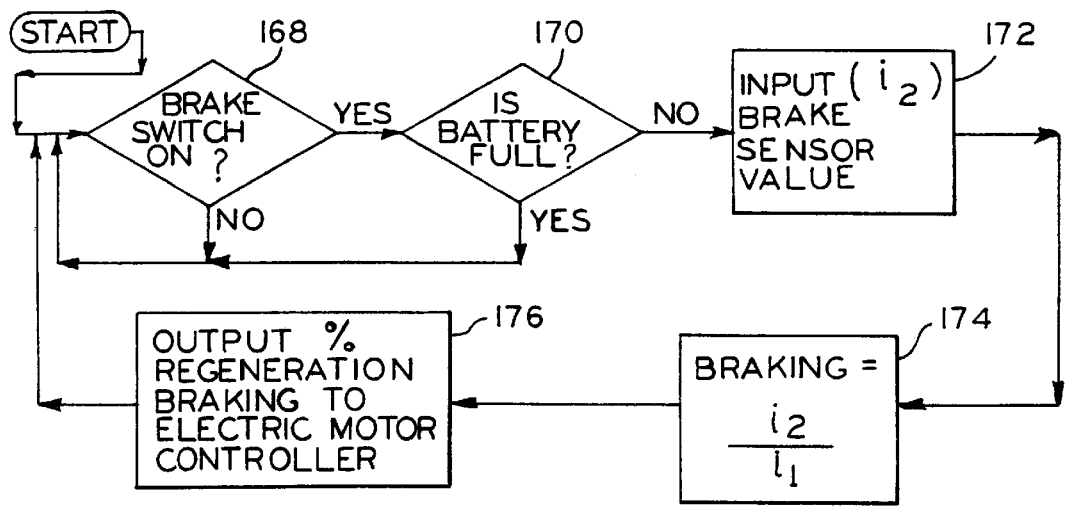
FIG_11
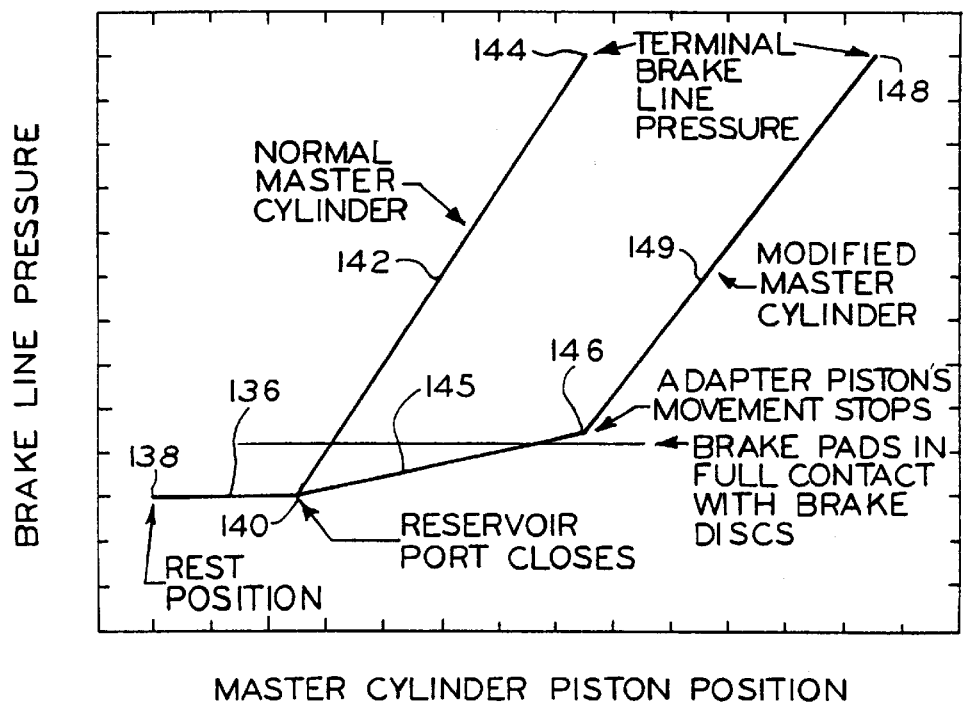
FIG_7

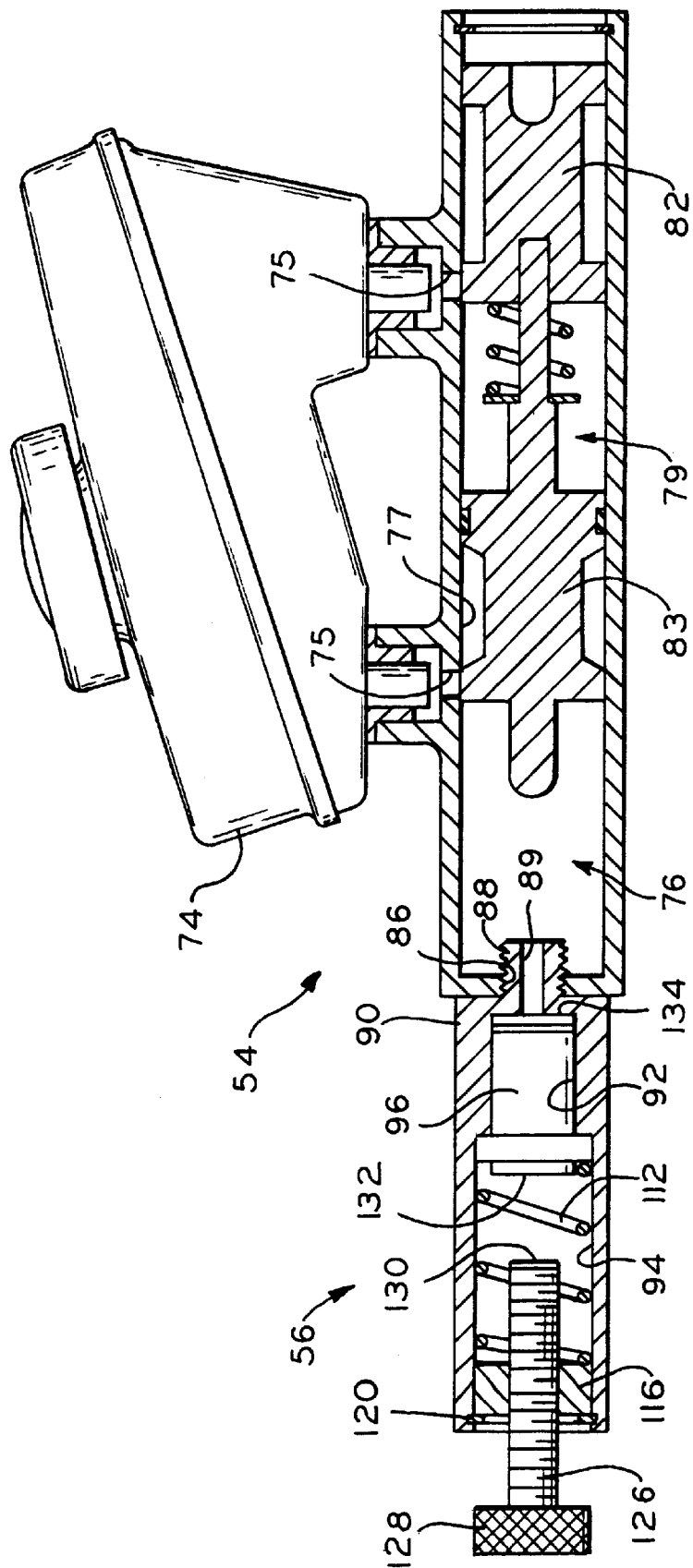
FIG_8B

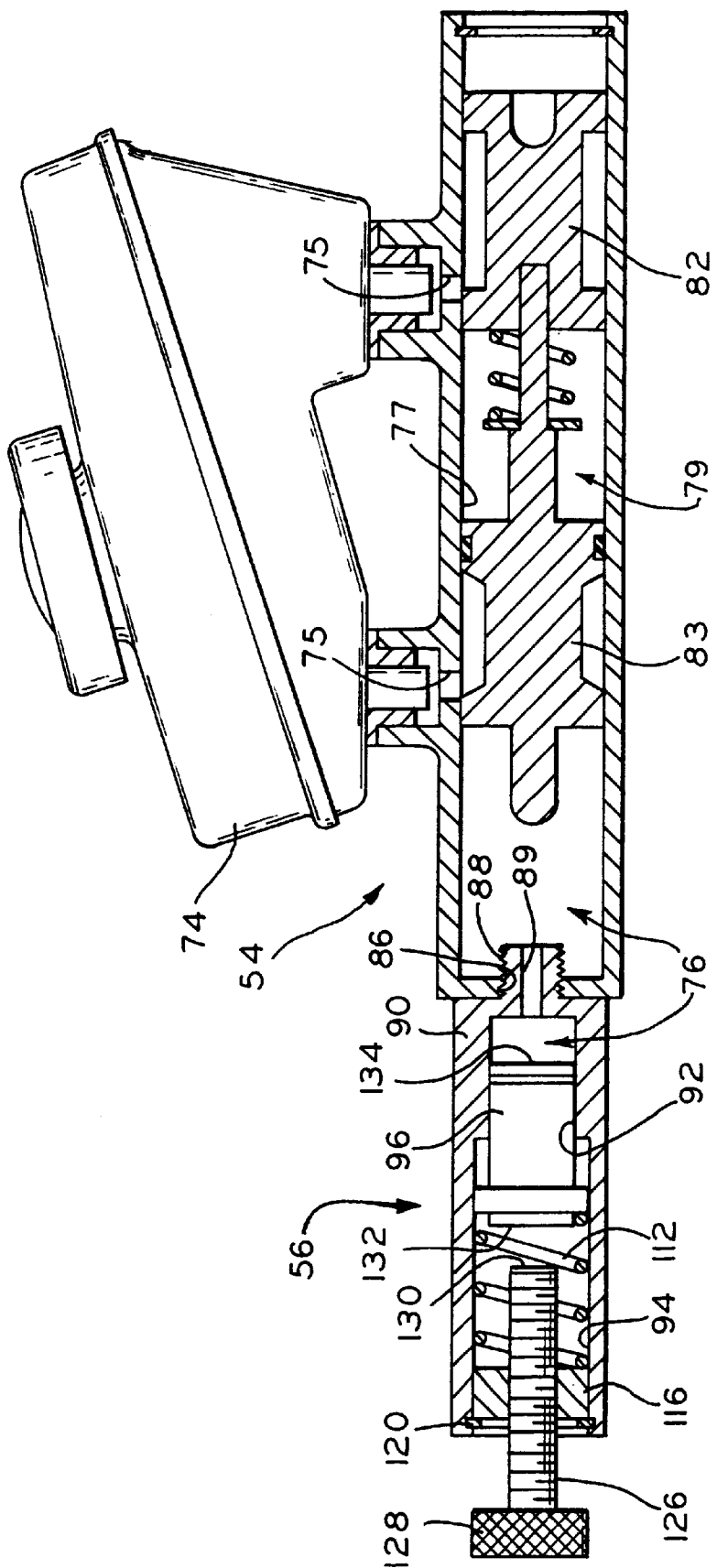
FIG_8C

HYBRID BRAKE SYSTEM

This invention was made with United States government support awarded by the following agency: ARMY Grant No. DAAH04-94-G-0328. The United States has certain rights in this invention.

BACKGROUND OF THE INVENTION

The present invention relates to braking systems for electric vehicles or hybrid electric vehicles, and in particular to braking systems which comprise a regenerative braking system in conjunction with a conventional, mechanical friction braking system. As the term is used herein, "electric" vehicles are those which are propelled solely by an electric motor which receives energy from an on-board storage battery; "hybrid electric" vehicles are those which may be propelled, generally at different times, by either an electric motor, which receives energy from either an on-board storage battery or from a generator operatively coupled to an internal combustion engine (a "series hybrid electric vehicle"), or by an internal combustion engine selectively operatively coupled to the ground-engaging wheels (a "parallel hybrid electric vehicle"). Thus, while both electric and hybrid electric vehicles comprise a rechargeable on-board storage battery, electric vehicles are propelled by an electric motor alone, whereas hybrid electric vehicles are propelled by an electric motor and also comprise an internal combustion engine which is also used for propulsion or, alternatively, for generating electrical power via a generator to recharge the battery.

Generally, electrical power is connected to the motor only when driving propulsion is demanded by the operator (e.g., by pressing on the accelerator or "gas" pedal). At other times (during coasting or braking) the power feeding the motor is disconnected. The inertia of the moving vehicle, however, continues to rotate the rotor of the motor, which is coupled to a ground-engaging wheel of the vehicle. Regenerative braking systems use the rotating motor as a generator which works against an electrical load placed in communication with the motor/generator upon actuation of a vehicle braking control device, such as a brake pedal. The electrical load comprises the partially-depleted battery, which is at least partially recharged by the motor acting as a generator powered by the still-moving vehicle's inertia. The electrical load on the motor/generator slows the rotational speed thereof, thereby braking the vehicle.

Previous electric or hybrid electric vehicles have employed hybrid brake systems comprising both an electrical, regenerative brake system and a conventional, mechanical friction braking system. Generally, such vehicles couple the two brake systems so that they work together, with the regenerative braking system being first actuated upon initial depression of the brake pedal to slow the vehicle and provide a charge to the battery. Further depression of the brake pedal then additionally actuates, or completely switches to, the conventional mechanical braking system for stopping the vehicle. A problem encountered with prior hybrid brake systems, however, is that the transition from only regenerative braking to mechanical braking, alone or in combination with regenerative braking, has been abrupt, resulting in poor brake pedal "feel" and impairing the driveability the vehicle.

For example, some prior vehicles employing hybrid braking systems used only regenerative braking until the brake pedal was depressed a considerable distance toward the floorboard. Drivers operating these vehicles felt very little pedal resistance and encountered sluggish transition from regenerative braking to conventional braking because there was little or no pressure in the brake lines. Drivers of these vehicles overcorrected by stomping on the brakes, abruptly applying the conventional mechanical brake system, thereby causing erratic handling of the vehicle.

A means for providing a smooth transition between regenerative and conventional braking in an electric or hybrid electric vehicle is desired.

SUMMARY OF THE INVENTION

The present invention addresses the shortcomings of prior hybrid braking systems in electric or hybrid electric vehicles by providing a smooth transition between regenerative and conventional friction braking.

The present invention provides a hybrid brake system for a vehicle propelled at least by a rotating electric motor powered by a storage battery and in communication with at least one ground-engaging wheel, and includes an electrical brake system comprising the electric motor and the battery, and a vehicle braking control device. The battery provides an electrical load on the motor during times when the vehicle braking control device is actuated, the rotation of the motor during actuation of the vehicle braking control device providing electrical power to the battery, whereby the battery receives an electrical charge. The motor rotation slowed by the electrical load and the vehicle is thus braked by the motor. The hybrid brake system of the present invention also includes a mechanical brake system comprising a hydraulic cylinder with a piston sealably and slidably disposed therein. One side of the piston and the hydraulic cylinder partially define a chamber of variable volume, the pressure of the fluid therein varying with movement of the piston in the cylinder. A mechanical brake arrangement is in fluid communication with the chamber and is operatively coupled to at least one ground-engaging wheel for slowing the rotation thereof. The mechanical brake arrangement is variably actuated in response to changes in the pressure of the fluid during times when the vehicle braking control device is actuated, whereby the vehicle is braked by the mechanical brake system. The inventive hybrid brake system further includes means for deferring substantial actuation of the mechanical brake arrangement during actuation of the vehicle braking control device until after the electrical brake system has been actuated. The deferring means includes means for expanding the chamber volume in response to an increase in pressure of the fluid in the chamber.

In certain embodiments of the present invention, the above-described means for deferring substantial actuation of the mechanical brake arrangement includes partially defining the chamber with a displaceable wall which moves between a first position and second position. The wall is biased into the first position and is urged toward the second position by an increase in the pressure of the fluid in the chamber below a threshold pressure. Substantial application of the mechanical brake system during actuation of the vehicle brake control device is deferred until the threshold pressure is reached.

The present invention also provides a method for braking a vehicle propelled at least by a rotating electric motor powered by a battery, which includes the steps of: actuating a vehicle braking control device; placing the motor in mechanical communication with a rotating ground-engaging wheel and an electrical load comprising the battery; generating electrical energy with the motor; absorbing at least a portion of the electrical energy generated by the motor with the battery, thereby slowing the rotation of the motor, whereby the motor slows the vehicle; increasing the pressure of a fluid in a chamber between a first pressure and a threshold pressure during actuation of the vehicle braking control device, during which time the motor is slowing the vehicle; delaying application of a substantial fluid pressure to a mechanical brake arrangement in fluid communication with the chamber and in operative communication with a rotating ground-engaging wheel during actuation of the vehicle braking control device, until after the pressure of the fluid in the chamber has been increased to at least the threshold pressure; and applying a substantial fluid pressure above the threshold pressure to the mechanical brake arrangement during actuation of the vehicle braking control device, during which time the rotation of the ground-engaging wheel is slowed, whereby the mechanical brake arrangement further slows the vehicle.

The herein-described hybrid brake system and method has proven to be simple, and the results provided thereby closely approximate the feel of conventional braking alone. The present design can be implemented into production with little additional cost to the product and has no additional maintenance requirements. The present design is a low cost solution which can be retrofitted into existing electric or hybrid electric vehicles, or easily integrated into new models.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3 is a partial sectional side view of a conventional master cylinder and its fluid reservoir, to which the present invention may be adapted;

FIG. 4 is a sectional side view of the master cylinder and reservoir of FIG. 3, modified with an embodiment of the present invention attached thereto;

FIG. 5A is a sectional side view of the master cylinder of FIG. 4 with the adapted components of the present invention assembled thereto;

FIG. 6 is an exploded sectional side view of the assembly of FIG. 5A;

FIG. 7 is a graph of master cylinder piston position versus brake line pressure for an embodiment of the present invention;

FIG. 8B is a the modified master cylinder of FIG. 8A in a successive second position;

FIG. 8C is a the modified master cylinder of FIG. 8A in a successive third position;

FIG. 11 is a flowchart describing the logic for applying the hybrid brake system of the present invention.

Figure 1:
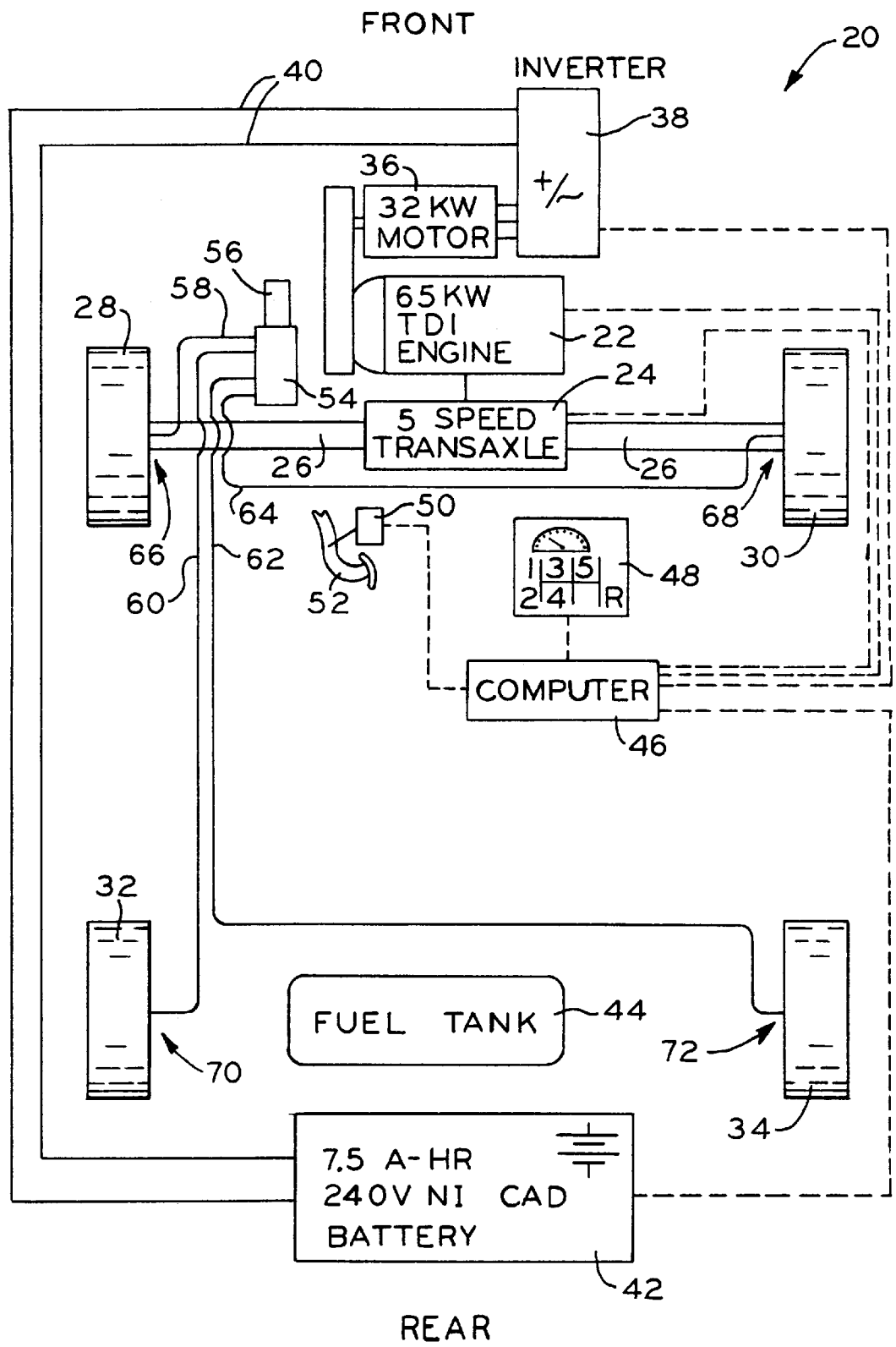
FIG. 1 is a plan view schematic of a hybrid electric vehicle including the hybrid brake system of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DETAILED DESCRIPTION OF THE INVENTION

Referring to FIG. 1 there is shown a plan view schematic of a hybrid electric vehicle which employs one embodiment of a hybrid brake system according to the present invention. Although the depicted embodiment is shown adapted to one type of hybrid electric vehicle, it is be understood that the inventive hybrid brake system may be adapted to other types of hybrid electric vehicles or electric vehicles.

Vehicle 20 comprises internal combustion engine 22, which in the depicted example is a diesel engine. Engine 22 is operatively coupled by known means to transaxle 24, from which extend axle shafts 26 drivingly coupled to ground-engaging front wheels 28 and 30. Vehicle 20 further comprises ground-engaging rear wheels 32 and 34.

Electric motor 36, which may be, for example, an AC induction motor, is mechanically coupled to engine 22 and transaxle 24. When electrically powered, motor 36 is used for propulsion, driving transaxle 24 and thus wheels 28, 30. Motor 36 is electrically powered through DC-to-AC inverter 38, which is electrically connected via cables 40 to battery 42 disposed at the rear of vehicle 20, behind fuel tank 44. Tank 44 provides a source of fuel for engine 22. In the depicted embodiment, battery 42 is a 7.5 Ampere-hour, 240 VDC (1.8 kW-hour) Nickel Cadmium battery.

Vehicle 20 is also provided with computer 46 which controls application of the inventive hybrid brake system's regenerative braking portion. Computer 46 may also be used to control other aspects of the vehicle's operation beyond the scope of the present invention. Indeed, it is envisioned that computer 46 may be integrated into a single controller (not shown) for the entire vehicle. As shown by the dashed lines in FIG. 1, computer 46 communicates with driver interface 48, rheostat 50, which is in mechanical communication with brake pedal assembly 52 and comprises part of the vehicle braking control device, battery 42, engine 22, transaxle 24 and inverter 38.

Figure 2:
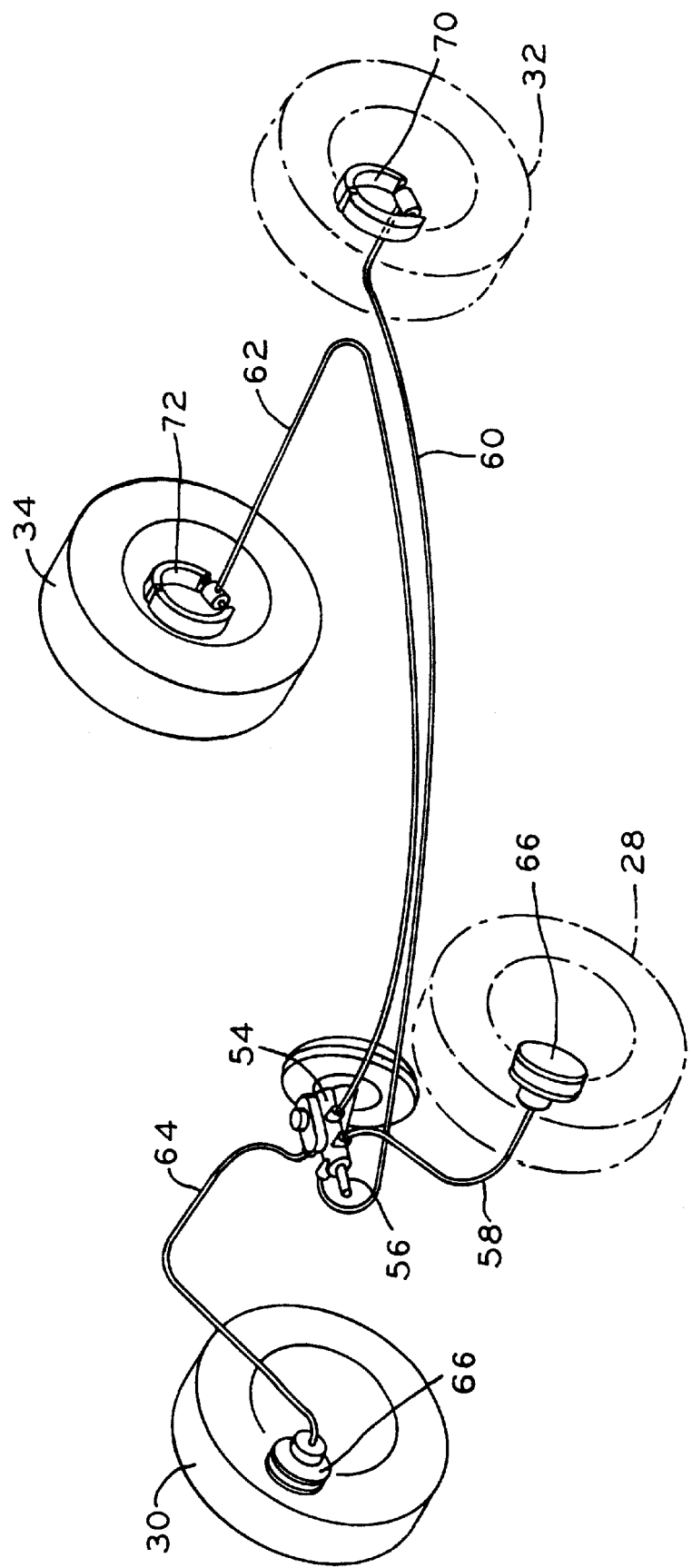
FIG. 2 is a perspective schematic view of the conventional braking system of the vehicle of FIG. 1.

In the conventional manner, brake pedal assembly 52 is in mechanical communication with hydraulic brake master cylinder 54, which is of the ordinary type, but modified in accordance with the present invention. In the present embodiment, as will be described further hereinbelow, hybrid brake cylinder 56 is in fluid communication with master cylinder 54. As usual in conventional mechanical braking systems, extending from master cylinder 54 is a plurality of brake lines 58, 60, 62 and 64 which extend from a fluid chamber within master cylinder 54 to mechanical brake devices 66, 68, 70 and 72 at each wheel 28, 30, 32 and 34, respectively. Mechanical brake devices 66, 68, 70 and 72, which together comprise a mechanical brake arrangement, are of conventional friction type such as disc brakes or drum brakes, and are hydraulically linked to master cylinder 54 through brake lines 58, 60, 62 and 64. In the conventional manner, as the pressure of the hydraulic fluid within the master cylinder increases, each of the mechanical brake devices is increasingly actuated, and frictionally brakes its associated, ground-engaging wheel. FIG. 2 best shows the hydraulic communication of the mechanical brake arrangement with master cylinder 54. Also shown in FIG. 2 is hybrid brake cylinder 56 attached to master cylinder 54.

Referring now to FIG. 3, there is shown master cylinder 54' which is entirely conventional in design and well known in the art. Master cylinder 54' is provided with a supply of hydraulic brake fluid (not shown) from reservoir 74 disposed atop the master cylinder through ports 75. Ports 75 are sealed against external leakage with o-rings (not shown). The fluid from reservoir 74 is provided to fluid chamber 76' disposed within master cylinder 54' and which is partially defined by cylinder 77 and piston 83 slidably and sealably disposed therein. In the well know manner, piston 82 is mechanically linked to brake pedal assembly 52 and moves within cylinder 77 in response to depression of the pedal. Generally, primary piston 82 provides fluid pressure to one pair of the four brake lines while secondary piston 83 provides fluid pressure to the other pair of brake lines. The pressure of the fluid in space 79 between pistons 82 and 83 is, for the most part, influenced by the pressure in chamber 76'. Secondary piston 83 is primarily in fluid communication with primary piston 82 and moves therewith by means of fluid pressure therebetween. Piston 83 thus moves in response to depression of the brake pedal. As piston 83 is moved with depression of the brake pedal, the volume of chamber 76' is reduced and the pressure of the fluid therein, and in the brake lines communicating therewith, increases. The mechanical brake arrangement of the vehicle is actuated in response to the changing hydraulic pressure level within the master cylinder. The brake lines are connected to the master cylinder by conventional means such as fittings 78 and 80.

Referring now to FIG. 4 there is shown ordinary master cylinder 54' of FIG. 3 adapted with hybrid cylinder 56 of the present invention. End wall 84 of modified master cylinder 54 is provided with threaded hole 86 into which fitting 88 of hybrid cylinder 56 is received. Fitting 88 has passageway 89 extending from its terminal end into the interior of hybrid cylinder 56, thereby placing master cylinder 54 and hybrid cylinder 56 in fluid communication.

Referring now to FIGS. 5A and 6, there is shown a sectional view of the assembly of master cylinder 54 and hybrid cylinder 56. Pistons 82, 83 are not shown in FIGS. 5A and 6; nor is reservoir 74. Hybrid cylinder 56 comprises housing 90 within which are provided small diameter cylinder 92 and coaxially adjacent larger diameter cylinder 94. Small diameter portion 98 of piston 96 is slidably and sealably disposed within small diameter cylinder 92, large diameter portion 100 of piston 96 slidably disposed in larger diameter cylinder 94. In the circumferential surface of small diameter piston portion 98 is O-ring groove 102 within which is disposed O-ring seal 104 which seals the circumferential surface of small diameter piston portion 98 against the wall of cylinder 92.

Opposite axial sides of large diameter portion 100 of piston 96 provide first and second annular shoulders 106, 108, respectively. First shoulder 106 abuts annular shoulder 110 formed at the junction of cylinders 92 and 94 when piston 96 is in a first position. Piston 96 is biased into its first position by spring 112, the end of which abuts second annular surface 108. The opposite end of spring 112 abuts first annular surface 114 of stop member 116. On the opposite axial side of stop member 116 is second annular surface 118 which abuts snap ring 120 disposed in snap ring groove 122 provided in the surface of cylinder 94, near its open end, thereby retaining piston 96 and spring 112 within housing 90.

Stop member 116 is provided with central threaded hole 124 within which is received the threaded portion of stop bolt 126. The exteriorly-located end of stop bolt 126 is provided with knurled knob 128 for adjusting the advancement of stop bolt 126 within threaded hole 124. The interface of cylinder 94 and stop member 116 may be provided with means (not shown) for preventing rotation of stop member 116. The adjustment of bolt 126 establishes the second position which piston 96 will achieve when its axial end surface 132 abuts interiorly-located terminal end 130 of stop bolt 126. Because piston 96 is moveable between its first and second positions, axial end surface 134 of piston 96, in effect, serves as a displaceable wall of chamber 76. Chamber 76 is thus contractible and expandible and is defined by fluidly connected cylinders 77 and 92, the end surface of piston 83 and axial end surface 134 of piston 96. As will be further discussed below, the volume of chamber 76 decreases as pistons 82, 83 move with depression of the brake pedal, and the pressure of the fluid in chamber 76 increases in response thereto, moving piston 96 away from its first position towards its second position against the biasing force of spring 112. The rate of contraction of the volume of space 76 as piston 96 moves between its first and second positions is substantially reduced vis-a-vis a corresponding movement of piston 83 in ordinary master cylinder 54', and no substantial actuation of the mechanical brake arrangement occurs until surface 132 of piston 96 abuts terminal end 130 of stop bolt 126. Once the second position of piston 96 is achieved, the mechanical brake system operates in the normal fashion.

The movement of piston 96 is dictated by a simple force balance equation:

$$P_{fluid} \times A_{134} = K_{spring} \times d_{96} \qquad \text{(equation 1)}$$

wherein $P_{fluid}$ is the hydraulic pressure (pounds per square inch) of the fluid in chamber 76 and the brake lines leading therefrom to the mechanical brake arrangement; $A_{134}$ is the area (square inches) of axial piston surface 134, against which the fluid acts; $K_{spring}$ is the spring rate (pounds per inch) of spring 112; and $d_{96}$ is the distance (inches) piston 96 has moved from its first position.

Referring now to FIG. 7, there is shown a graphical comparison of the relationship between master cylinder piston position (i.e., the position of piston 83) and brake line fluid pressure for an ordinary or normal master cylinder (e.g., master cylinder 54' of FIG. 3) and for a master cylinder modified in accordance with the present invention (e.g., master cylinder 54 of FIG. 4).

Referring first to a normal master cylinder, line 136 extends between points 138 and 140 as piston 83 moves from its rest position (point 138) to the position where ports 75 of the master cylinder are covered (point 140). Along line 136, changes in brake line pressure are negligible, and no appreciable mechanical braking is effected. Once ports 75 are covered, however, at point 140, the fluid pressure increases substantially, following line 142 to the maximum, terminal brake line pressure at point 144. As shown, line 142 is substantially linear, although it may be instead be somewhat curvilinear.

Figure 5B:
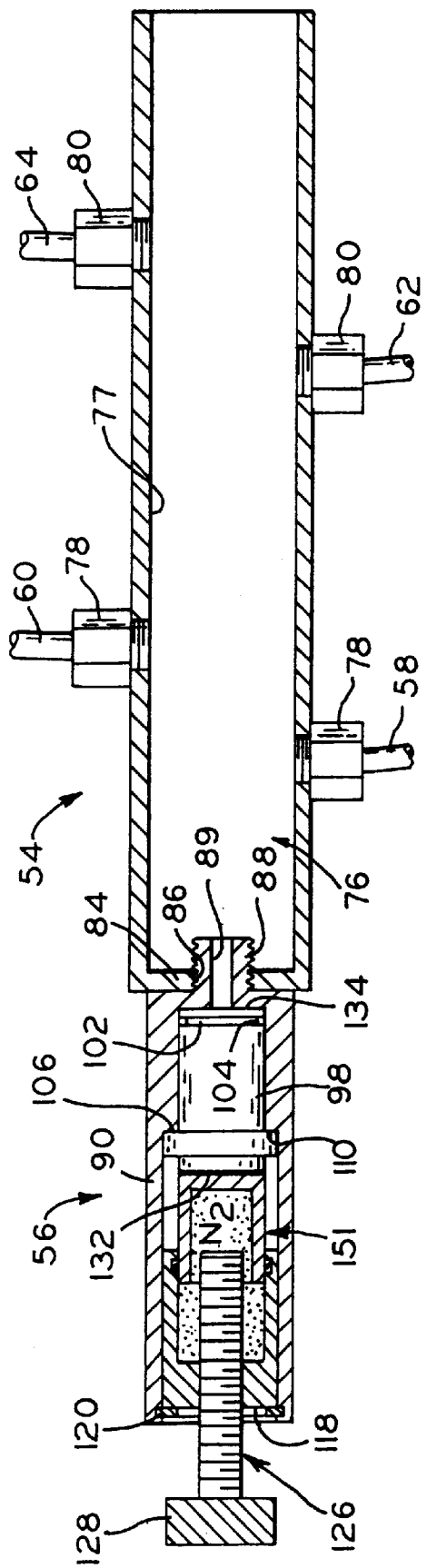
FIG. 5B is a sectional side view of the master cylinder of FIG. 4 with adapted alternative components of the present invention assembled thereinto.

Referring now to a master cylinder modified in accordance with the present invention, again piston 83 moves from its rest position (point 138) along line 136 until ports 75 are covered (point 140). Following line 145, which extends between points 140 and 146, changes in brake line pressure are insubstantial, and no appreciable mechanical braking is effected, as in the case of the normal master cylinder. At point 140, ports 75 are covered and piston 96 is in its first position. Proceeding along line 145, piston 96 is moving in response to the slight increase in fluid pressure in chamber 76 towards its second position, which is achieved at point 146. Here, the slight increase in fluid pressure brings the brake pads or shoes of the mechanical brake arrangement into light contact with their respective discs or drums, but no substantial mechanical braking is effected. During the portion of master cylinder piston travel along lines 136 and 145, only regenerative braking is occurring, as will be discussed further hereinbelow. Between points 146 and 148, along line 149, the fluid pressure in chamber 76 and the brake lines increases substantially and the brake arrangement is actuated as along line 142. In the modified master cylinder case, terminal brake line pressure (point 148) is the same as the pressure at point 144. As shown, lines 145 and 149 are substantially linear, although it may instead be somewhat curvilinear. For example, hybrid cylinder 56 may comprise, instead of spring 112, a nitrogen-filled cylinder 151 (FIG. 5B). Alternatively, the liquid in chamber 76 may compress a nitrogen-filled bladder, as in a hydraulic accumulator. As piston 96 compresses the nitrogen gas, a non-linear response curve would result. Further, lines 142 and 149 are shown to be approximately parallel, although it is envisioned that there may slight differences in the rate of fluid pressure increases with piston travel between the normal and modified master cylinders. It should be noted that although regenerative braking is occurring along lines 136 and 145, in certain embodiments of the present invention regenerative braking also continues along line 149, during frictional braking, as discussed further hereinbelow.

Figure 8A:
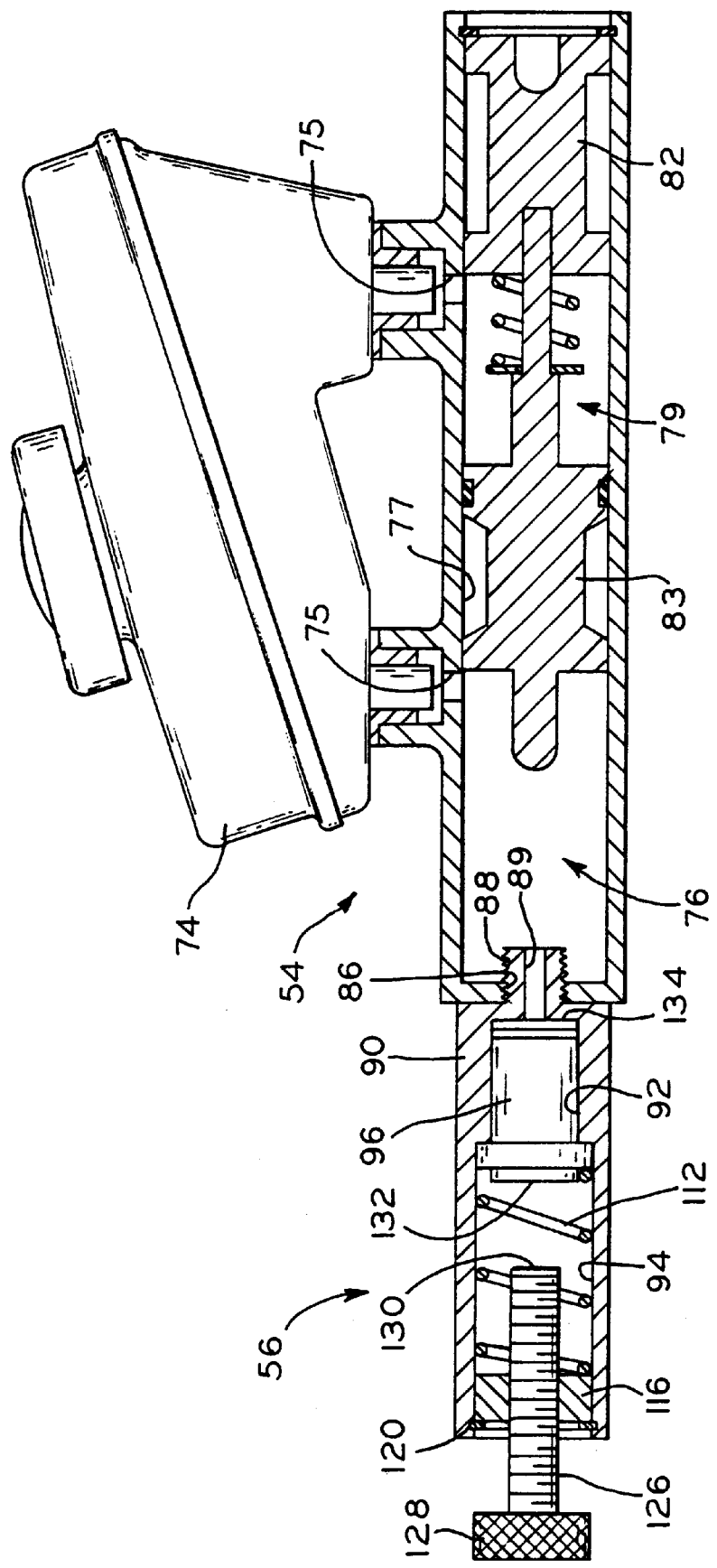
FIG. 8A is a sectional side view of the modified master cylinder of FIG. 4 showing the pistons thereof in a first position.

Referring to FIGS. 8A–8D, there is shown a succession of views of master cylinder 54 and hybrid cylinder 56 during brake operation, illustrating how the volume of chamber 76, and thus the fluid pressure acting on the mechanical brake arrangement, varies with travel of master cylinder piston 83. FIG. 8A illustrates the rest position, corresponding to point 138 of FIG. 7, wherein piston 96 is at its first position. FIG. 8B illustrates a position in which ports 75 have just been closed by master cylinder pistons 82, 83, corresponding to point 140 of FIG. 7; piston 96 is still at its first position.

FIG. 8C illustrates a position at which piston 96 has been moved from its first position towards its second position, against the force of spring 112. This position corresponds to a point between points 140 and 146, along line 145 of FIG. 7. The force necessary to overcome spring 112 accounts for the positive slope of line 145, but this increase in pressure is insufficient to provide any substantial mechanical braking effect, and while piston 96 is between its first and second positions only the regenerative braking system acts to brake the vehicle.

Figure 8D:
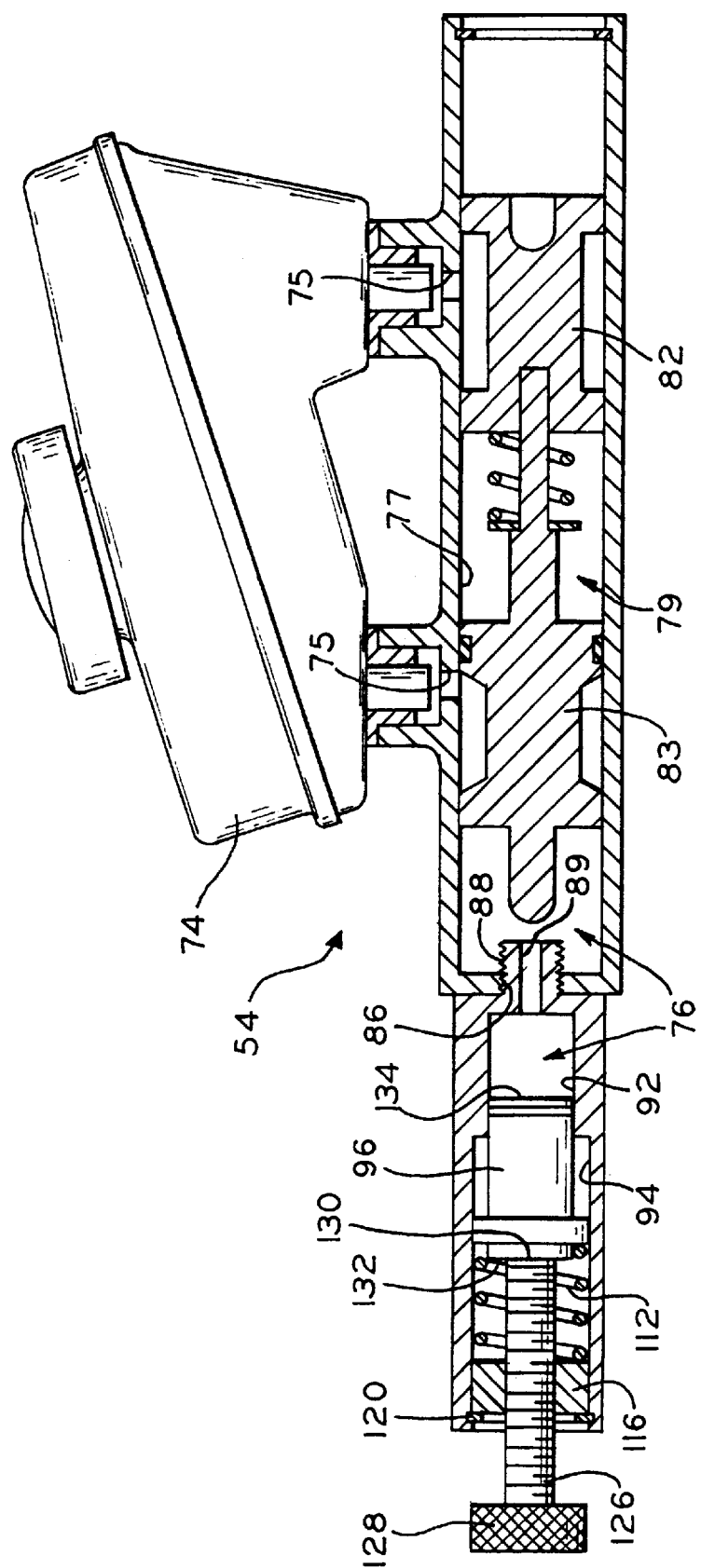
FIG. 8D is a the modified master cylinder of FIG. 8A in a successive fourth position.

FIG. 8D illustrates a position at which piston 96 is in its second position, its axial surface 132 abutting terminal end 130 of stop bolt 126. This position corresponds to a point between points 146 and 148, along line 149 of FIG. 7. Once piston 96 has reached its second position, the mechanical braking system is operational, and substantial hydraulic pressure is provided to the mechanical brake arrangement. As mentioned above, continued regenerative braking may also be applied during mechanical braking Referring now to FIG. 9, there is shown a portion of an ordinary vehicle braking control device for one embodiment of an electric or hybrid electric vehicle to which the present invention may be adapted. Brake pedal assembly 52, mechanically linked to master cylinder piston 82, pivots about pivot pin 150 and includes pin 152 which is attached to linearly-moving arm 154 of anti-lock braking system (ABS) switch 156. Switch 156 is electrically connected to an anti-lock braking control module (not shown) through wire harness 158, and operates in a conventional, well known way. It is not necessary for a vehicle adapted with the inventive hybrid brake system to include an ABS braking system or any sort of switch attached to the brake pedal as shown. The ABS switch of the depicted embodiment merely provides a structure which is convenient for adaptation of the below-described rheostat by which the electrical load on the motor/generator may be varied. Indeed, although convenient, it is not necessary for actuation of the electrical load of the regenerative brake system to be directly linked to the brake pedal assembly at all. Alternatively, for example, a pressure transducer may be provided in fluid communication with chamber 76, the transducer providing a variable voltage in response to fluid pressure changes therein which is communicated to computer 46. Computer 46 would then vary the load on motor/generator 36 during regenerative braking in a manner similar to that described below.

Figure 9:
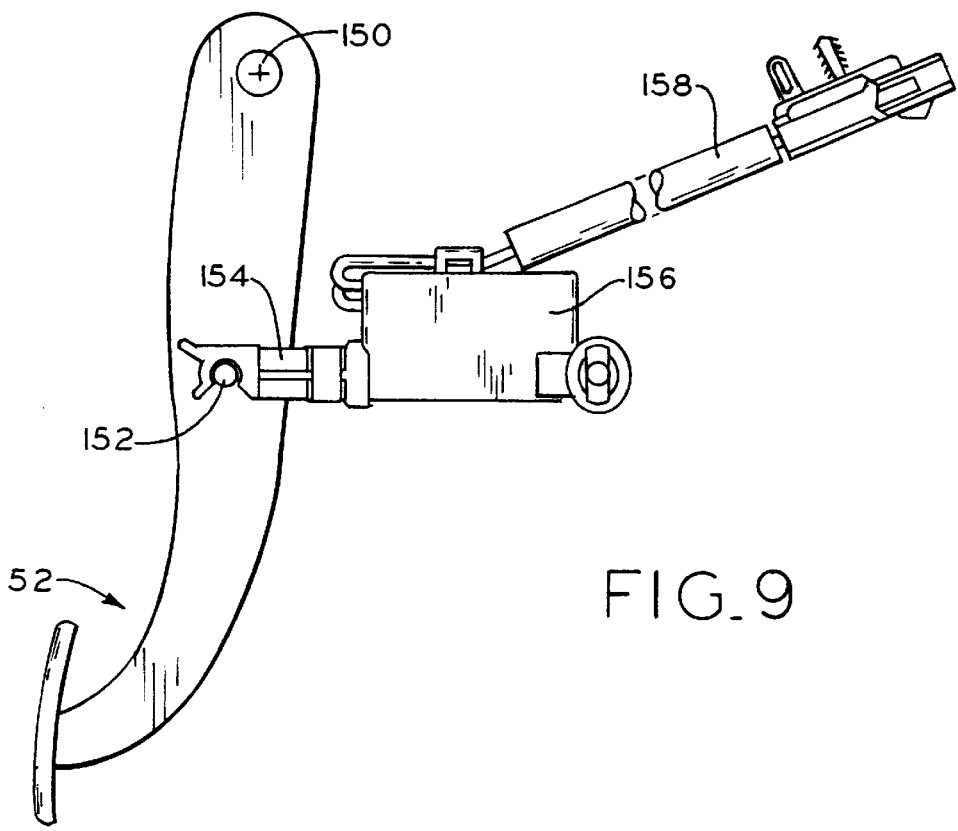
FIG. 9 is a side view of a brake pedal and anti-lock braking system (ABS) switch of a vehicle to which the present invention may be adapted.
Figure 10:
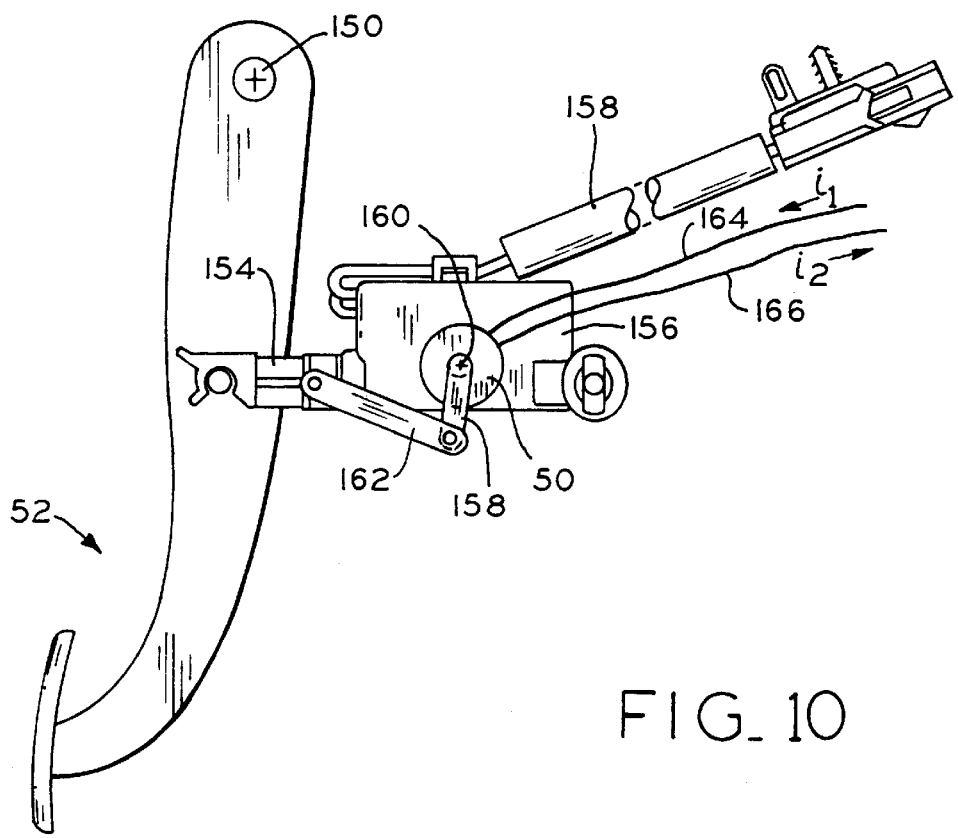
FIG. 10 is a side view of the brake pedal and ABS switch of FIG. 9, with the rotary rheostat of one embodiment of the present invention adapted thereto.

FIG. 10 shows the brake pedal assembly of FIG. 9 with rheostat 50 attached to the outer surface of ABS switch 156. Rheostat 50 is of a rotary-type, providing varying amounts of resistance to a current flowing therethrough as its crankarm 158 is rotated about its center 160. Link 162 is pivotally attached to the end of crankarm 158 and to linearly-movable arm 154 of ABS switch 156. As arm 154 is moved linearly toward or into switch 156 in response to depression of the brake pedal, link 162 causes rotation of crankarm 158 about center 160 of rheostat 50. By this means, a current $i_1$, flowing through wire 164 to rheostat 50 is variably reduced to a lower current level $i_2$ which flows through wire 166 to computer 46. Those skilled in the art will recognize that instead of rotary rheostat 50, a linear type may be used. Computer 46, as will be discussed further below, interprets the difference in current values $i_1$ and $i_2$ to vary the load on motor/generator 36 through control adjustments at inverter 38 and/or battery 42. Those skilled in the art will appreciate that computer 46 may be adapted to sense voltage values in lieu of current values, the logic of the computer as described below accordingly modified.

Referring now to FIG. 11, there is shown the basic control logic employed by computer 46 in varying the amount of electrical load on motor/generator 36 in response to changes in $i_2$ during regenerative braking. As discussed above, the inertial energy of the vehicle is converted into electrical energy by motor/generator 36, which is operatively coupled to ground-engaging wheels 28, 30. The electrical load on the motor/generator comprises battery 42 which, if not already fully charged, is at least partially recharged by the motor/generator during regenerative braking. As the load is continued or increased, the rotational speed of the motor is lowered, thereby braking the vehicle. Those skilled in the art will appreciate that where a very low resistance level is provided by rheostat 50, only a very small part of the electrical energy generated by motor/generator 36 is absorbed by the load. As the resistance level of rheostat 50 increases, a greater demand on the electrical energy generated by motor/generator 36 is effected, more heavily loading motor/generator 36 and causing its rotation to slow down, whereby the vehicle is increasingly braked by the motor with increased depression of the brake pedal.

The logic of FIG. 11 first inquires (symbol 168) as to whether the brake switch is on. The brake switch referred to here is ABS switch 156, although other means may be employed for determining whether the brakes have been activated. For example, a signal may be provided to the computer from a tail lamp brake lamp switch which will provide the necessary yes or no answer to the inquiry at symbol 168. If the brake switch is not on, the logic continues to loop through symbol 168 until the brakes are activated. Once the brake switch is on, indicating that the brakes have been actuated, an inquiry is made (symbol 170) as to whether the battery currently has a full electrical charge. If so, the logic loops back to and through symbol 168. If the battery is not fully charged, the logic proceeds to assess input value $i_2$ from the brake sensor (symbol 172). In the present embodiment, the brake sensor is rheostat 50. The input brake sensor value is then compared with a maximum brake sensor value, or $i_1$ (symbol 174). Based on the proportion of $i_1$ represented by $i_2$, a percentage value of the maximum regenerative braking level, or electrical load to be applied to the motor/generator, is then obtained (symbol 176). An electric motor controller (not shown), which may be an integral part of computer 46 or inverter 38, adjusts the load on motor/generator 36 to the appropriate level. The electrical load placed on the motor/generator inversely correlates to the value of $i_2/i_1$. That is, for $i_2/i_1=1$, where rheostat 50 provides no resistance, there is no load placed on motor/generator 36. For values of $i_2/i_1$ which are extremely small, the maximum electrical load is placed on the motor/generator. Thus, with increased depression of the brake pedal, the electrical load on the motor/generator is proportionally increased, thereby providing smooth and predictable application of the regenerative braking system.

Figure 12:
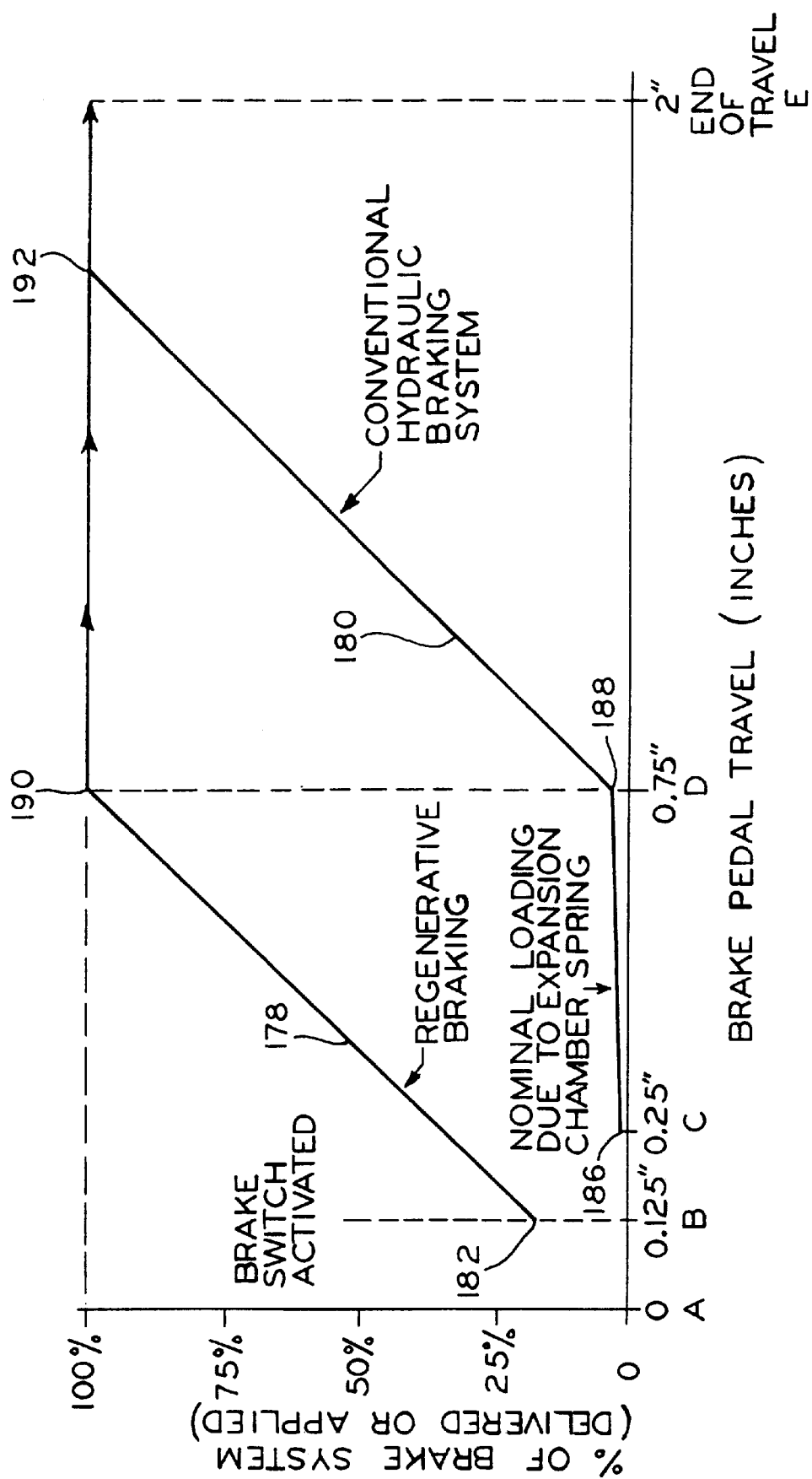
FIG. 12 is a graph of the conventional hydraulic brake system and the regenerative braking system separately showing there respective relationships between brake pedal travel and percent of the respective brake system delivered or applied.

Referring now to FIG. 12, the relationships between brake pedal travel (in inches) and the percent of the individual regenerative and mechanical brake systems applied are shown for the embodiment of vehicle 20. Line 178 shows the relationship between brake pedal travel and the percentage of the maximum regenerative braking system effect applied through motor/generator 36 in response to the varying resistance level provided by rheostat 50. Line 180 shows the relationship between brake pedal travel and the percentage of the maximum mechanical braking system effect applied through master cylinder 54 and hybrid cylinder 56 in response to the movements of piston 83 within cylinder 77 and piston 96 within cylinders 92, 94. Referring to the lefthand side of FIG. 12, point A represents the point where brake pedal assembly 52 is at rest in its non-braking position (i.e., zero pedal travel). In this position, which corresponds to point 138 of FIG. 7, the vehicle braking control device is not actuated.

As the brake pedal is depressed ⅛ inch from point A to point B, regenerative braking begins at point 182 (FIG. 12) along line 178. Although line 178 is shown as being linear, those skilled in the art will appreciate that regenerative braking need not be applied in such a fashion. Point 182 represents the situation where current $i_2$ divided by current $i_1$ yields a value substantially equal to 1, and no load is placed on motor/generator 36. Here, virtually no electrical energy being generated by motor/generator 36 is being provided to battery 42. As the brake pedal further travels from point B to point C, where the brake pedal has traveled ¼ inch from its rest position, ports 75 communicating fluid reservoir 74 and chamber 76 are closed. Here, piston 96 is still at its first position. At point 186 (FIG. 12), which corresponds to point 140 of FIG. 7, only nominal and insubstantial loading of the mechanical brake arrangement begins. Meanwhile, regenerative braking continues along line 178.

As the brake pedal further travels from point C toward point D, the fluid within chamber 76 is being compressed at a very slow rate, for spring 112 is being compressed by the movement of piston 96. Those skilled in the art will appreciate that the amount of fluid pressure rise between the first and second positions of piston 96 may be refined by changing the spring rate (K) of spring 112. Between points C and D, no substantial frictional braking is effected, for the pressure of the fluid in chamber 76 is still too low. Meanwhile, regenerative braking continues along line 178.

At point D, the brake pedal has traveled ¾ inch from its rest position, and the pads or shoes of the mechanical brake arrangement are in light contact with their respective discs or drums. Point 188 of FIG. 12 corresponds to point 146 of FIG. 7. At point 188 a threshold pressure in chamber 76 is reached, above which substantial braking is effected by the mechanical braking system, and frictional braking begins.

Point 190, at which regenerative brake line 178 reaches its maximum value, also occurs at position D. Hereafter, the regenerative braking system maintains 100% of its effect. That is to say, although arm 154 of brake switch 156 may travel linearly further, and crankarm 158 of rheostat 150 may rotate further, no further increase in the electrical load provided on motor/generator 36 will be attained. In the present embodiment of the invention, once position D has been reached, the regenerative braking system maintains 100% of its effect during operation of the mechanical braking system. Those skilled in the art will appreciate, however, that embodiments of the present invention may provide further increases in regenerative braking between point D and the end of brake pedal travel, at point E.

Returning to the present example, however, with the regenerative braking system reaching its 100% delivered effect at position D and maintaining that level through further brake pedal travel, piston 96 has, at position D, achieved its second position, with its face 132 abutting terminal end 130 of stop screw 126. At this point, piston 96 plays no further role in delaying the rise in pressure of the fluid in chamber 76. As shown in FIG. 12, with further brake pedal travel from point D to point E, curve 180 progresses from point 188 to point 192, applying increasing levels of mechanical friction braking while regenerative braking is maintained at 100%. Point 192 corresponds to point 148 of FIG. 7, at which terminal brake line pressure is reached.

To provide a smooth transition between regenerative and mechanical braking, it should be understood that, with reference to FIG. 12, 100% of regenerative braking should be approximately equivalent in braking force to the braking force provided along line 180 near point 188. Adjustments to the regenerative braking load and the rate of fluid pressure rise in chamber 76 may be fine-tuned to provide a smooth transition between regenerative and mechanical braking to suit a wide variety of vehicle characteristics.

The electrical load on the motor/generator may, for the most part, be adjusted through software changed in computer 46. As mentioned above, the rate of pressure increase in chamber 76 may be adjusted by changing spring 112 to one with a different spring rate or by changing the location of the second position of piston 96 by adjusting stop bolt 126. Once an appropriate design has been developed, stop member 116 and stop bolt 126 may be replaced with a stop member (not shown) which provides an annular surface similar to surface 114 against which spring 112 abuts, and a central stop surface against which surface 132 of piston 96 abuts in its second position.

Further, it is envisioned that a master cylinder assembly according to the present invention need not be comprised of assembled parts such as master cylinder 54 and hybrid adapted cylinder 56. Rather, it will be appreciated by those skilled in the art that hybrid cylinder 56 and master cylinder 45, although in hydraulic communication, may be remotely located from each other, or that a single master cylinder assembly (not shown) which essentially comprises the structure provided by the assembled components (FIG. 5) may be easily manufactured and will deliver the desired results which the depicted embodiment provides.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hybrid brake system for a vehicle propelled at least by a rotating electric motor powered by a storage battery and in communication with at least one ground-engaging wheel, comprising:
    a vehicle braking control device;
    an electrical brake system comprising the electric motor and the battery, said battery providing an electrical load on said motor during times when said vehicle braking control device is actuated, rotation of said motor during actuation of said vehicle braking control device providing electrical power to said battery, whereby said battery receives an electrical charge, said motor rotation slowed by said electrical load, whereby the vehicle is braked by said motor; and
    a mechanical brake system comprising a hydraulic cylinder, a piston sealably and slidably disposed in said hydraulic cylinder, one side of said piston and said hydraulic cylinder partially defining a chamber of variable volume, the pressure of the fluid in said chamber varying with movement of said piston in said cylinder, and a mechanical brake arrangement in fluid communication with said chamber and operatively coupled to at least one ground-engaging wheel for slowing the rotation thereof, said mechanical brake arrangement variably actuated in response to changes in the pressure of the fluid during times when said vehicle braking control device is actuated, whereby the vehicle is braked by said mechanical brake system; and
    means for deferring substantial actuation of said mechanical brake arrangement during actuation of said vehicle braking control device until after said electrical brake system has been actuated, said deferring means comprising means for expanding said chamber volume in response to an increase in pressure of the fluid in said chamber.

2. The hybrid brake system of claim 1, wherein said vehicle braking control device comprises a driver-actuated brake pedal.

3. The hybrid brake system of claim 2, wherein said piston is mechanically linked to said brake pedal for movement therewith.

4. The hybrid brake system of claim 2, wherein said vehicle braking control device further comprises a rheostat, a resistance to a current flowing through said rheostat changing in response to changes in the position of said brake pedal.

5. The hybrid brake system of claim 4, wherein said electrical load is increased in response to an increase in the resistive level of said rheostat.

6. The hybrid brake system of claim 2, wherein said vehicle braking control device further comprises a pressure transducer in fluid communication with said chamber, a voltage generated by said transducer changing in response to changes in the pressure of the fluid in said chamber.

7. The hybrid brake system of claim 6, wherein said electrical load is increased in response to an increase in the voltage generated by said transducer.

8. The hybrid brake system of claim 1, wherein said electrical load is increased with increased actuation of said vehicle braking control device.

9. The hybrid brake system of claim 1, wherein said piston is a first piston and said deferring means comprises a moveable second piston in fluid communication with said cylinder and partially defining said chamber, said second piston biased into a first position and moved towards a second position in response to increasing pressure of the fluid in said chamber.

10. The hybrid brake system of claim 9, wherein said mechanical brake arrangement is substantially actuated only once said second piston is in its said second position.

11. The hybrid brake system of claim 9, wherein said hydraulic cylinder is a first hydraulic cylinder, said second piston disposed in a second hydraulic cylinder in fluid communication with said first cylinder, said first and second cylinders partially defining said chamber.

12. The hybrid brake system of claim 9, wherein said second piston is biased into said first position by a spring.

13. The hybrid brake system of claim 9, wherein said second piston is biased into said first position by a pressurized gas.

14. The hybrid brake system of claim 1, wherein said deferring means comprises a pressurized gas, said gas compressed by the fluid in said chamber.

15. The hybrid brake system of claim 1, wherein said piston is a first piston, and said deferring means comprises a second piston, said chamber partially defined by said second piston, said second piston biased into a first position and moved to a second position in response to an increase of fluid pressure in said chamber, said fluid pressure reaching a threshold pressure when said second piston reaches said second position, said mechanical brake apparatus substantially actuated only by a fluid pressure above said threshold pressure.

16. The hybrid brake system of claim 1, wherein said electrical and mechanical brake systems comprise a serially-actuated braking system, whereby said mechanical brake is system actuated only after actuation of said electrical brake system.

17. The hybrid brake system of claim 1, wherein said electrical and mechanical brake systems comprise a parallel-actuated braking system, whereby said mechanical brake system is actuated contemporaneously with said electrical brake system.

18. A hybrid brake system for a vehicle propelled at least by a rotating electric motor powered by a storage battery and in communication with at least one ground-engaging wheel, comprising:

a vehicle braking control device;

an electrical brake system comprising the electric motor and the battery, said battery providing an electrical load on said motor during times when said vehicle braking control device is actuated, rotation of said motor during actuation of said vehicle braking control device providing electrical power to said battery, whereby said battery receives an electrical charge, said motor rotation slowed by said electrical load, whereby the vehicle is braked by said motor; and a mechanical brake system comprising a hydraulic cylinder, a piston sealably and slidably disposed in said hydraulic cylinder, one side of said piston and said hydraulic cylinder partially defining a chamber of variable volume, the pressure of the fluid in said chamber varying with movement of said piston in said cylinder, and a mechanical brake arrangement in fluid communication with said chamber and operatively coupled to at least one ground-engaging wheel for slowing the rotation thereof, said mechanical brake arrangement variably actuated in response to changes in the pressure of the fluid during times when said vehicle braking control device is actuated, whereby the vehicle is braked by said mechanical brake system; and wherein said chamber is also partially defined by displaceable wall which moves between a first position and second position, said wall biased into said first position, said wall being moved toward said second position by an increase in the pressure of the fluid in said chamber below a threshold pressure, whereby substantial application of said mechanical brake system during actuation of said vehicle brake control device is deferred until said threshold pressure is reached.

19. A method for braking a vehicle propelled at least by a rotating electric motor powered by a battery, comprising the steps of:

actuating a vehicle braking control device;

placing the motor in mechanical communication with a rotating ground-engaging wheel and an electrical load comprising the battery;

generating electrical energy with the motor;

absorbing at least a portion of the electrical energy generated by the motor with the battery, thereby slowing the rotation of the motor, whereby the motor slows the vehicle;

increasing the pressure of a fluid in an expandible chamber between a first pressure and a threshold pressure during actuation of the vehicle braking control device, during which time the motor is slowing the vehicle;

expanding the chamber while the pressure of the fluid in the chamber increases from the first pressure to the threshold pressure;

delaying application of a substantial fluid pressure to a mechanical brake arrangement in fluid communication with the chamber and in operative communication with a rotating ground-engaging wheel during actuation of the vehicle braking control device, until after the pressure of the fluid in the chamber has been increased to at least the threshold pressure; and applying a substantial fluid pressure above the threshold pressure to the mechanical brake arrangement during actuation of the vehicle braking control device, during which time the rotation of the ground-engaging wheel is slowed, whereby the mechanical brake arrangement further slows the vehicle.

* * * * *